United States Patent
Ji

(10) Patent No.: US 8,175,174 B2
(45) Date of Patent: May 8, 2012

(54) COMMUNICATION SYSTEM, COMMUNICATION METHOD, TRANSMITTING APPARATUS AND RECEIVING APPARATUS

(75) Inventor: Kuiwen Ji, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 425 days.

(21) Appl. No.: 12/476,761

(22) Filed: Jun. 2, 2009

(65) Prior Publication Data
US 2009/0238320 A1 Sep. 24, 2009

Related U.S. Application Data

(63) Continuation of application No. PCT/CN2008/070146, filed on Jan. 21, 2008.

(30) Foreign Application Priority Data
Jan. 23, 2007 (CN) .......................... 2007 1 0000299

(51) Int. Cl.
H04L 27/00 (2006.01)
(52) U.S. Cl. ......... 375/259; 375/295; 375/316; 375/327
(58) Field of Classification Search .................. 375/259, 375/327, 354, 355, 376, 295, 316
See application file for complete search history.

(56) References Cited

U.S. PATENT DOCUMENTS

| 4,926,447 A * | 5/1990 | Corsetto et al. ............... 375/376 |
|---|---|---|
| 7,042,908 B1 | 5/2006 | Mayer |
| 7,453,911 B2 * | 11/2008 | Honken et al. ................. 370/505 |
| 7,856,074 B2 * | 12/2010 | Kuwata ......................... 375/371 |
| 2001/0038646 A1 | 11/2001 | Van Der Putten et al. |
| 2003/0048813 A1 | 3/2003 | Lahav et al. |
| 2003/0086442 A1 * | 5/2003 | Reynolds et al. ............. 370/503 |
| 2004/0008804 A1 * | 1/2004 | Honken et al. ................. 375/375 |
| 2004/0242445 A1 * | 12/2004 | Lee ................................ 510/175 |
| 2005/0057315 A1 * | 3/2005 | Groen et al. ..................... 331/57 |
| 2005/0074032 A1 | 4/2005 | Surek |

(Continued)

FOREIGN PATENT DOCUMENTS

CN 1435016 A 8/2003
(Continued)

OTHER PUBLICATIONS

European Search Report for Application No. 08700803.3. dated Dec. 4, 2009.

(Continued)

*Primary Examiner* — Jean B Corrielus
(74) *Attorney, Agent, or Firm* — Finnegan, Henderson, Farabow, Garrett & Dunner LLP

(57) ABSTRACT

A communication system, communication method, transmitting apparatus, and receiving apparatus are disclosed herein. The communication system includes: a first clock correlating unit, adapted to correlate a clock to be transmitted with a clock of a data frame at a transmitter of a clock transparent-transmission network; and a second clock correlating unit, adapted to correlate a clock of a data frame at a receiver of a clock transparent-transmission network with a clock to be recovered. The method includes: correlating the clock to be transmitted with the clock of the data frame at the transmitter of the clock transparent-transmission network, and correlating the clock of the data frame at the receiver of the clock transparent-transmission network with the clock to be recovered.

15 Claims, 6 Drawing Sheets

U.S. PATENT DOCUMENTS

| | | | |
|---|---|---|---|
| 2005/0129158 A1* | 6/2005 | Kuwata | 375/376 |
| 2006/0164266 A1* | 7/2006 | Riedel et al. | 341/50 |
| 2007/0116061 A1* | 5/2007 | Meagher et al. | 370/503 |
| 2007/0133996 A1* | 6/2007 | Kyouno | 398/140 |

FOREIGN PATENT DOCUMENTS

| | | |
|---|---|---|
| CN | 1536804 A | 10/2004 |

OTHER PUBLICATIONS

Patent Cooperation Treaty, Written Opinion of the International Searching Authority for Application No. PCT/CN2008/070146, mailed May 8, 2008 (4 pages).

International Search Report from P.R. China in International Application No. PCT/CN2008/070146 mailed May 8, 2008.

Second Chinese Office Action dated (mailed) Apr. 2, 2011, issued in related Chinese Application No. 200710000299.0 Huawei Technologies Co., Ltd.

First Chinese Office Action dated (mailed) Jun. 28, 2010, issued in related Chinese Application No. 200710000299.0, Huawei Technologies Co., Ltd.

Communication Pursuant to Articla 94(3) EPC dated Oct. 18, 2011 for European Application No. 08 700 803.3-2415 issued by European Patent Office, 5 pages.

* cited by examiner

COMMUNICATION SYSTEM, COMMUNICATION METHOD, TRANSMITTING APPARATUS AND RECEIVING APPARATUS

CROSS REFERENCE TO RELATED APPLICATIONS

This application is a continuation of International Patent Application No. PCT/CN2008/070146, filed on Jan. 21, 2008, which claims priority to Chinese Patent Application No. 200710000299.0, filed on Jan. 23, 2007, both of which are hereby incorporated by reference in their entireties.

FIELD OF THE DISCLOSURE

The present disclosure relates to the communication field, and in particular, to a communication system, communication method, transmitting apparatus, and receiving apparatus.

BACKGROUND

In the communication field, the data services, data switching and transmission are currently performed in the Ethernet through packet forwarding. The packet is forwarded through a local clock (transmission frequency). Because all the Network Elements (NEs) in a working system may have different local clocks, both sides of the packet switching network need to be synchronized through a synchronization technology.

In the prior art, the data transmitted on an Optical Transport Network (OTN) is encapsulated through a Transparent Generic Framing Procedure (GFP-T) encapsulation method.

Because the GFP-T encapsulates all data (including IDLE) of fast ethernet (FE), the receiver may receive all transmitter data, where the data rate is the physical layer clock frequency of the transmitter. The receiver may recover the physical layer clock frequency of the transmitter by using a phase-locked loop based on the data receiving rate.

However, in the process of implementing the present disclosure, it was found that the foregoing synchronization technology, when applied to the OTN, leads to a low utilization ratio of bandwidth and waste of bandwidth because all data is encapsulated through the GFP-T encapsulation method. Moreover, the receiver uses a complicated phase-locked loop to recover the clock based on the data receiving rate, resulting in complicated technology, high costs, and fragile performance.

SUMMARY

A communication system method, transmitting apparatus and receiving are provided in an embodiment of the present disclosure to transmit the clock transparently.

A communication system provided in an embodiment of the present disclosure includes: a first clock correlating unit adapted to correlate the clock to be transmitted with the clock of the data frame at the transmitter of the clock transparent-transmission network; and a second clock correlating unit adapted to correlate the clock of the data frame at the receiver of the clock transparent-transmission network with the clock to be recovered.

A transmitting apparatus includes: a first clock correlating unit adapted to correlate the clock to be transmitted with the clock of the data frame at the transmitter of the clock transparent-transmission network.

A receiving apparatus includes: a second clock correlating unit adapted to correlate the clock of the data frame at the receiver of the clock transparent-transmission network with the clock to be recovered.

A communication method includes: correlating, at a transmitter of a clock transparent-transmission network, a clock to be transmitted with a clock of a data frame at the transmitter of the clock transparent-transmission network; and correlating, at a receiver of the clock transparent-transmission network, the clock of the data frame at the receiver of the clock transparent-transmission network with a clock to be recovered.

DETAILED DESCRIPTION

In the embodiments of the present disclosure, two clock correlating units, such as a phase-locked loop, are added at the transmitter and receiver of the signal in a network which transmits clocks transparently, for example, a Plesiochronous Digital Hierarchy (PDH) network; data is transmitted separately from the clock in the Ethernet; at the receiver, the correlated clock is correlated in a different way, or de-correlated to recover the clock which was applied before the correlation. In this way, the clock is transmitted transparently in a cost-efficient and high-quality manner, and a high bandwidth utilization ratio is selectable.

The present disclosure is elaborated below by reference to several embodiments and accompanying drawings. However, the following embodiments are not intended to limit the scope of the present disclosure, and the technical solution disclosed in the present disclosure and its variations are easily applicable to other communication technologies. The functional entities or data/messages in such communication technologies may be different, but still fall within the protection scope of the present disclosure.

Figure 1:
FIG. 1 shows a structure of a communication system in the first embodiment of the present disclosure.

As shown in FIG. 1, a communication system in the first embodiment of the present disclosure includes: a first clock correlating unit 410 adapted to correlate the clock to be transmitted with the clock at the transmitter of the clock transparent-transmission network 420; and a second clock correlating unit 430 adapted to correlate the clock at the receiver of the clock transparent-transmission network 420 with the clock to be recovered.

In summary, the clock is correlated at the transmitter of the clock transparent transmission network 420. That is, the clock to be transmitted is correlated with the clock at the transmitter of the clock transparent-transmission network 420. Therefore, even if the physical layer clock of the input data to be transmitted is different from the clock at the transmitter of the clock transparent-transmission network 420, or even if the time changes, the information about such difference or change is already recorded according to the correlation before the data is transmitted. In this way, through the same or reverse correlation mode, the receiver may re-correlate or de-correlate the data transmitted by the clock transparent-transmission network 420 to obtain the data which keeps a stable clock correlation with the data input by the transmitter. Compared with the prior art which adds a complicated phase-locked loop to the receiving module, the embodiments of the present disclosure transmit the clock transparently in a cost-efficient and high-quality manner, and make the high bandwidth utilization ratio selectable.

Figure 2:
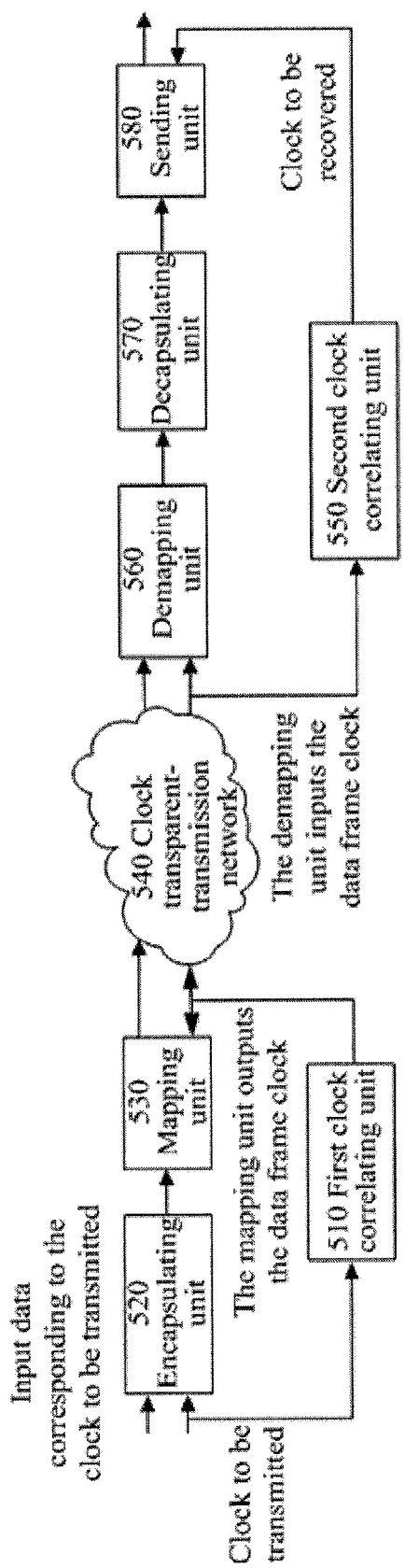
FIG. 2 shows a structure of the communication system illustrated in FIG. 1.

As shown in FIG. 2, the following structures may be added to the communication system provided in the first embodiment of the present disclosure: an encapsulating unit 520 adapted to encapsulate the input data and transmit the data to a mapping unit 530, where, accordingly, the second clock correlating unit is adapted to correlate the data input clock of the encapsulating unit 520 with the data output clock of the mapping unit 530; a mapping unit 530 adapted to map the encapsulated data to the data of the optical channel layer, where the mapping data output clock is a transmitter data frame clock that needs to be correlated by the first clock correlating unit 510; a demapping unit 560 adapted to demap the data transmitted through the clock transparent-transmission network 540, where the demapping data output clock is a clock which needs to be correlated by the second clock correlating unit 550 and needs to be recovered; a decapsulating unit 570 adapted to decapsulate the demapped data; and a sending unit 580 adapted to send out the decapsulated data, where, accordingly, the second clock correlating unit 550 is adapted to correlate the data input clock of the demapping unit 560 with the data output clock of the sending unit 580.

More embodiments may be derived from the foregoing embodiment. For example, as shown in FIG. 2, in the second embodiment of the communication system, the first clock correlating unit 510 is realized as a first phase-locked loop and the second clock correlating unit 550 is realized as a second phase-locked loop on the basis of the first embodiment. The first phase-locked loop tracks the clock that needs to be transmitted, outputs the data output clock of the mapping unit 530, and transmits the mapped data through the clock transparent-transmission network 540. The specific circuit mechanism is: The first phase-locked loop inputs the physical layer clock of the input-side data of the encapsulating unit 520, outputs the data output clock of the mapping unit 530, and transmits the clock to the demapping unit 560 through a clock transparent-transmission network 540. The second phase-locked loop tracks the data input clock of the demapping unit 560, and outputs the clock that needs to be recovered to the sending unit 580. The specific circuit mechanism is: The second phase-clocked loop inputs the data output clock of the mapping unit 530, which is transmitted through the clock transparent-transmission network 540, and outputs the data output clock of the sending unit 580, which is correlated with the data input clock of the second phase-locked loop. The sending unit 580 is adapted to send out the decapsulated data according to the data output clock of the second phase-locked loop.

Figure 3:
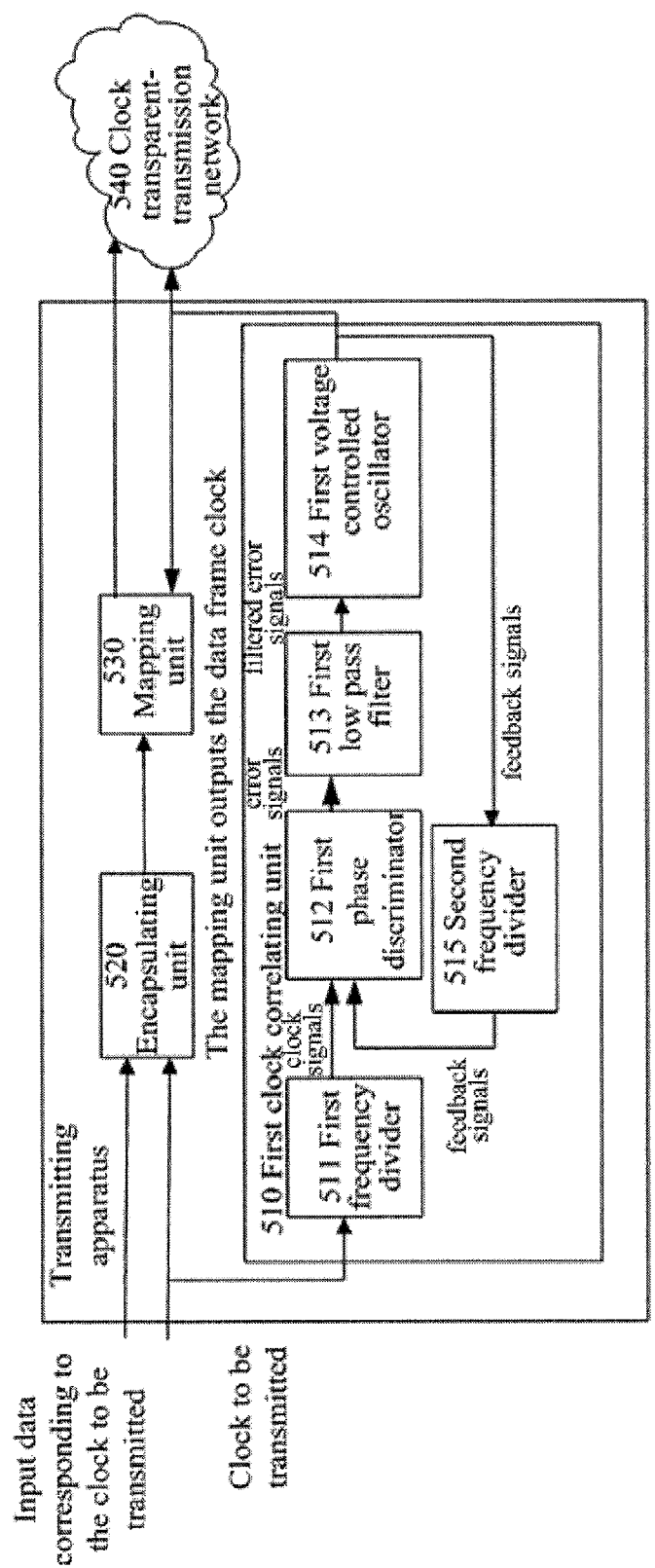
FIG. 3 shows a structure of a transmitting apparatus in an embodiment of the present disclosure.

As shown in FIG. 3, a transmitting apparatus provided in an embodiment of the present disclosure includes: a first clock correlating unit 510 adapted to correlate the clock to be transmitted with the clock of the data frame at the transmitter of the clock transparent-transmission network 540; an encapsulating unit 520 adapted to: encapsulate the input data corresponding to the clock to be transmitted, and transmit the data to the mapping unit 530; and a mapping unit 530 adapted to map the encapsulated data to the data transmitted through the clock transparent-transmission network 540.

In this case, the first clock correlating unit 510 is adapted to correlate the data input clock of the encapsulating unit 520 with the data output clock of the mapping unit 530.

The first clock correlating unit 510 is a phase-locked loop. Correlating the data input clock of the encapsulating unit 520 with the data output clock of the mapping unit 530 refers to: The first phase-locked loop tracks the clock to be transmitted, inputs the physical layer clock of the input-side data of the encapsulating unit 520, and outputs the data output clock of the mapping unit 530 and transmits this clock through a clock transparent-transmission network 540.

Figure 4:
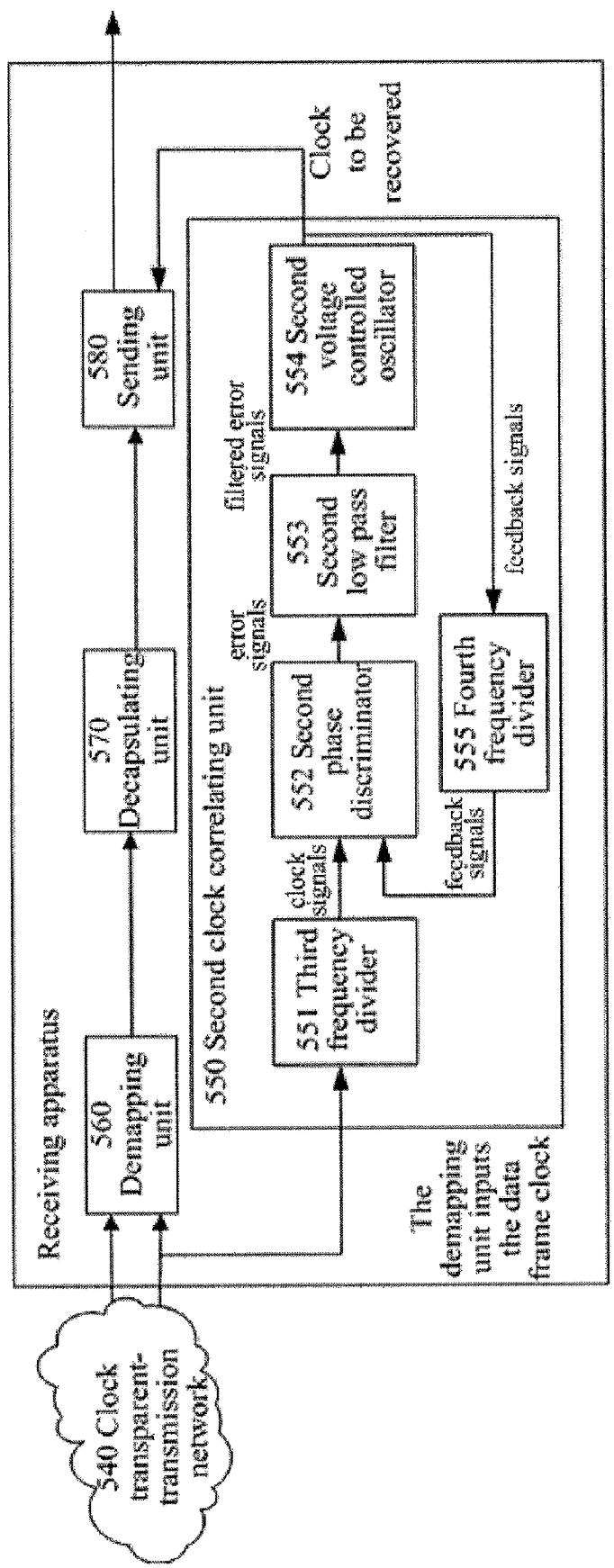
FIG. 4 shows a structure of a receiving apparatus in an embodiment of the present disclosure.

As shown in FIG. 4, a receiving apparatus provided in an embodiment of the present disclosure includes: a second clock correlating unit 550 adapted to correlate the clock of the data frame at the receiver of the clock transparent-transmission network 540 with the clock to be recovered; a demapping unit 560 adapted to demap the optical channel layer data transmitted through the clock transparent-transmission network 540; decapsulating unit 570 adapted to decapsulate the demapped data; and a sending unit 580, adapted to send out the decapsulated data.

In this case, the second clock correlating unit 550 is adapted to correlate the data input clock of the demapping unit 560 with the data output clock of the sending unit 580.

The second clock correlating unit 550 is a phase-locked loop. Correlating the data input clock of the demapping unit 560 with the data output clock of the sending unit 580 refers to: The second phase-locked loop inputs the data output clock of the mapping unit 530, which is transmitted through the clock transparent-transmission network 540, and outputs the data output clock of the sending unit 580. The sending unit 580 is adapted to send out the decapsulated data according to the data output clock of the second phase-locked loop.

As shown in FIG. 3 and FIG. 4, in the foregoing embodiments, both the first phase-locked loop and the second phase-locked loop include a phase discriminator 512, 552, a low pass filter 513, 553, and a voltage controlled oscillator 514, 554. The phase discriminator inputs the frequency-divided clock signals from frequency dividers 511, 551, and the voltage controlled oscillator 514, 554 outputs the frequency-divided feedback signals, and outputs error signals to the low pass filter 513, 553. The low pass filter 513, 553 filters the error signals, and outputs signals to control the voltage controlled oscillator 514, 554 to output a clock.

Specifically, the first phase-locked loop includes: a first phase discriminator 512, a first low pass filter 513, and a first voltage controlled oscillator 514. The first phase discriminator 512 inputs two channels of clock signals. One channel is clock signals of the clock to be transmitted, where the clock signals pass through the first frequency divider 511; and the other channel is feedback signals output by the first voltage controlled oscillator 514, where the feedback signals pass through the second frequency divider 515. The first phase discriminator 512 outputs error signals to the first low pass filter 513. The first low pass filter 513 filters the error signals and outputs the signals, thus controlling the first voltage controlled oscillator 514 to output the clock of the data frame at the transmitter of the clock transparent-transmission network 540.

The second phase-locked loop includes: a second phase discriminator 552, a second low pass filter 553, and a second voltage controlled oscillator 554. The second phase discriminator 552 inputs two channels of clock signals. One channel is clock signals of the data input clock of the demapping unit 560, where the clock signals pass through the third frequency divider 551; and the other channel is feedback signals output by the second voltage controlled oscillator 554, where the feedback signals pass through the fourth frequency divider 555. The second phase discriminator 552 outputs error signals to the second low pass filter 553. The second low pass filter 553 filters the error signals and outputs the signals, thus controlling the second voltage controlled oscillator 554 to output the clock that needs to be recovered.

In this embodiment, the ratio of the first frequency divider value to the second frequency divider value of the first phase-locked loop is equal to the ratio of the fourth frequency divider value to the third frequency divider value of the second phase-locked loop. In other embodiments, the ratio of the first frequency divider value to the second frequency divider value, and the ratio of the fourth frequency divider value to the third frequency divider value may be any proper values.

In other embodiments, the phase-locked loop is a digital, analog or hybrid phase-locked loop. The data input by the encapsulating unit 520 is Fast Ethernet (FE), Gigabyte Ethernet (GE) or 10 Gigabyte Ethernet (10 GE) data. The mapping unit 530 is specifically adapted to map the encapsulated data to the data of the Optical Channel Payload Unit (OPUk), Optical Channel Data Unit (ODUk) or Optical Channel Transport Unit (OTUk) clock; and the encapsulating unit 520 is a Framed Generic Framing Procedure (GFP-F), Transparent Generic Framing Protocol (GFP)-T or Point-to-Point Protocol (PPP) encapsulating unit.

Figure 5:
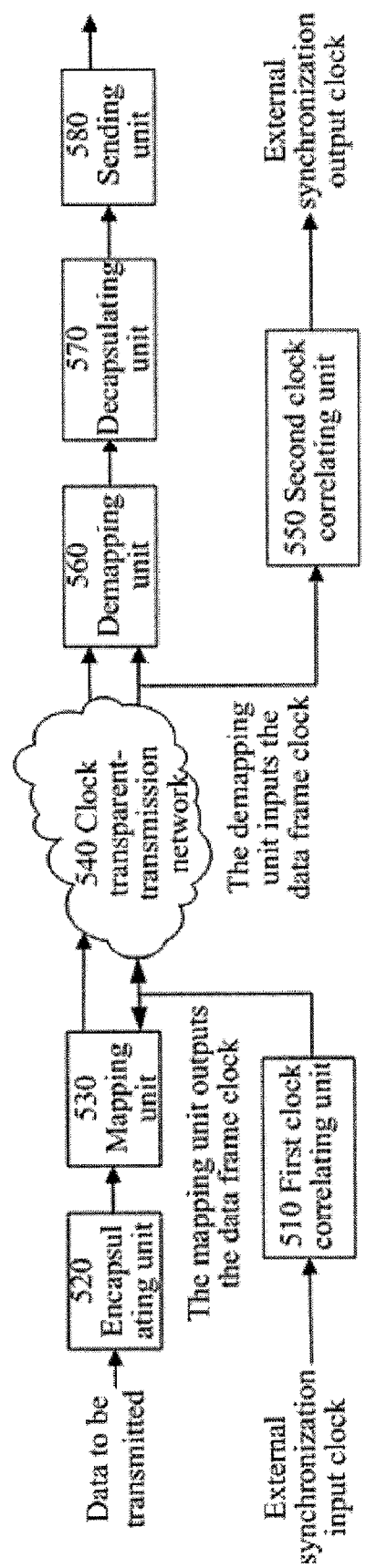
FIG. 5 shows a structure of a communication system in the second embodiment of the present disclosure.

As shown in FIG. 5, the second embodiment of the communication system is similar to the first embodiment of the communication system under the present disclosure except the following.

(1) The clock followed by the first clock correlating unit 510 is an external synchronization input clock rather than the physical layer clock which inputs the input-side data of the encapsulating unit 520.

(2) The second clock correlating unit 550 follows the data input clock of the demapping unit 560, and outputs the external synchronization output clock rather than the data output clock of the sending unit 580.

This embodiment implements the clock synchronization function as well, and accomplishes the technical effect similar to the first embodiment of the communication system under the present disclosure.

By analogy, the transmitting apparatus and receiving apparatus provided herein may be modified according to the structure of the communication system in the second embodiment of the present disclosure.

The communication method in the first embodiment of the present disclosure includes: correlating the clock to be transmitted with the clock of the data frame at the transmitter of the clock transparent-transmission network 540, and correlating the clock of the data frame at the receiver of the clock transparent-transmission network 540 with the clock to be recovered.

Correlating the clock to be transmitted with the clock of the data frame at the transmitter of the clock transparent-transmission network 540 refers to: mapping the data of the clock to be transmitted to the data frame transmitted through the clock transparent-transmission network 540, and setting up a correlation between the clock to be transmitted and the ante-mapping data frame clock. Correlating the clock of the data frame at the receiver of the clock transparent-transmission network 540 with the clock to be recovered refers to: demapping the data frame at the receiver of the clock transparent-transmission network 540, and setting up a correlation between the ante-demapping input data clock and the clock to be recovered.

Figure 6:
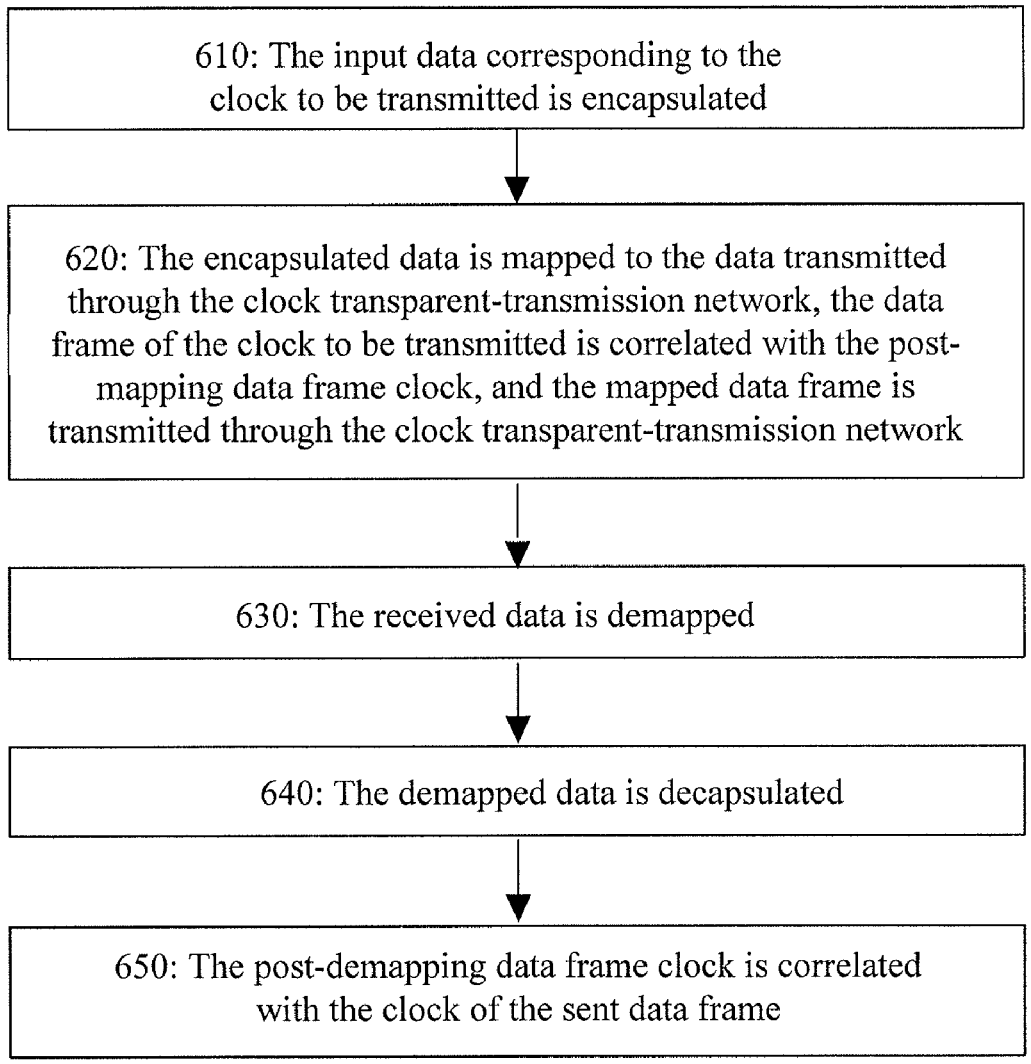
FIG. 6 is a flowchart of a communication method in an embodiment of the present disclosure.

As shown in FIG. 6, after the foregoing method is applied to data transmission, the method includes:

610: The input data corresponding to the clock to be transmitted is encapsulated.

The input data is input through FE, GE or 10 GE, and encapsulating refers to encapsulating the input data in the GFP-F, GFP-T or PPP mode.

620: The encapsulated data is mapped to the data transmitted through the clock transparent-transmission network 540, the clock to be transmitted is correlated with the post-mapping data frame clock, and the mapped data is transmitted through the clock transparent-transmission network 540.

Mapping to the data transmitted through the clock transparent-transmission network 540 refers to mapping the encapsulated data to the data of the OPUk, ODUk or OTUk clock.

630: The received data is demapped.

640: The demapped data is decapsulated.

650: The ante-demapping data frame clock is correlated with the clock of the sent data frame. That is, the clock of the received data frame is correlated with the clock of the sent data frame, and data is sent according to the correlated clock. The clock of the sent data frame is the data clock which needs to be recovered.

Two phase-locked loops are applied. One phase-locked loop correlates the clock to be transmitted with the post-mapping data frame clock, and the other phase-locked loop correlates the clock of the received data frame with the clock of the sent data frame. The clocks may be correlated through the digital, analog or hybrid phase-locked loop.

In summary, the clock is correlated at the transmitter of the clock transparent transmission network 540. That is, the clock to be transmitted is correlated with the clock of the data frame at the transmitter of the clock transparent-transmission network 540. Therefore, even if the physical layer clock of the input data to be transmitted is different from the clock at the transmitter of the clock transparent-transmission network 540, or even if the time changes, the information about such difference or change is already recorded according to the correlation before the data is transmitted. In this way, through the same or reverse correlation mode, the receiver may re-correlate or de-correlate the data transmitted by the clock transparent-transmission network 540 to obtain the data which keeps a stable clock correlation with the data input by the transmitter and implement transparent transmission of clocks. Compared with the prior art which adds a complicated phase-locked loop to the transmitting module, the embodiments of the present disclosure transmit the clock transparently in a cost-efficient and high-quality way, and make the high bandwidth utilization ratio selectable.

The second embodiment of the communication method is similar to the first embodiment of the communication method under the present disclosure except the following.

(1) In step 620, "correlating the clock to be transmitted with the physical layer clock output after mapping" is changed to "correlating the external synchronization input clock with the post-mapping data frame clock".

(2) In step 650, "correlating the physical layer clock of the received data with the clock of the sent data frame" is changed to "correlating the ante-demapping data frame clock with the external synchronization output clock".

This embodiment also accomplishes the technical effect similar to the first embodiment of the communication method under the present disclosure.

Detailed above refers to a communication system, communication method, transmitting apparatus, and receiving apparatus under the present disclosure. Although the disclosure is described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A transmitting apparatus, comprising:
a clock correlating unit configured to correlate a clock to be transmitted with a clock of a data frame at a transmitter of a clock transparent-transmission network; and
a mapping unit configured to map data to be transmitted to the data frame at the transmitter of the clock transparent-transmission network, wherein the clock of the data frame output after mapping is a transmitter data frame clock that needs to be correlated by the clock correlating unit;
wherein the clock correlating unit is a phase-locked loop for tracking the clock to be transmitted, and a clock output by the phase-locked loop serves as a data output clock of the mapping unit.

2. The transmitting apparatus of claim 1, wherein the clock to be transmitted is one of the clock corresponding to the data to be transmitted or an external input clock, and wherein when the clock to be transmitted is the clock corresponding to the data to be transmitted, the transmitting apparatus further comprises:
an encapsulating unit configured to encapsulate the data to be transmitted which corresponds to the clock to be transmitted, and transmit the data to be transmitted to the mapping unit; and
the clock correlating unit is configured to correlate a data input clock of the encapsulating unit with a data output clock of the mapping unit.

3. The transmitting apparatus of claim 1, wherein:
the phase-locked loop comprises:
a phase discriminator,
a low pass filter, and
a voltage controlled oscillator; and wherein
the phase discriminator is configured to input two channels of clock signals, wherein one channel of clock signals is clock signals from the clock to be transmitted, and the other channel of clock signals is feedback clock signals output by the voltage controlled oscillator;
the phase discriminator is configured to output error signals to the low pass filter; and
the low pass filter is configured to filter the error signals and output the filtered error signals to control the voltage controlled oscillator to output the clock of the data frame at the transmitter of the clock transparent-transmission network.

4. The transmitting apparatus of claim 1, wherein:
the phase-locked loop comprises:
a phase discriminator,
a low pass filter, and
a voltage controlled oscillator; and wherein
the phase discriminator is configured to input two channels of clock signals, wherein one channel of clock signals is clock signals which come from the clock to be transmitted and pass through a first frequency divider, and the other channel is feedback clock signals which are output by the voltage controlled oscillator and pass through a second frequency divider;
the phase discriminator is configured to output error signals to the low pass filter; and
the low pass filter is configured to filter the error signals and output the filtered error signals to control the voltage controlled oscillator to output the clock of the data frame at the transmitter of the clock transparent-transmission network.

5. The transmitting apparatus of claim 1, wherein: the clock transparent-transmission network is an Optical Transport Network (OTN) and the clock of the data frame at the transmitter of the clock transparent-transmission network is the clock of an Optical Channel Payload Unit (OPUk) data frame, Optical Channel Data Unit (ODUk) data frame, or Optical Channel Transport Unit (OTUk) data frame at the transmitter of the OTN.

6. A receiving apparatus, comprising:
a clock correlating unit configured to correlate a clock of a data frame at a receiver of a clock transparent-transmission network with a clock to be recovered; and
a demapping unit configured to demap the data frame at the receiver of the clock transparent-transmission network, wherein the clock of the data frame input by the demapping unit is a receiver data frame clock to be correlated by the clock correlating unit in the clock transparent-transmission network.

7. The receiving apparatus of claim 6, wherein:
the clock correlating unit is a phase-locked loop, which is configured to track the clock of input data of the demapping unit, and output the clock to be recovered.

8. The receiving apparatus of claim 7, wherein the receiving apparatus further comprises:
a decapsulating unit configured to decapsulate the data demapped by the demapping unit; and
a sending unit configured to send out the decapsulated data according to the clock to be recovered; and wherein
the clock correlating unit is configured to correlate a data input clock of the demapping unit with a data output clock of the sending unit.

9. The receiving apparatus of claim 7, wherein the phase-locked loop comprises:
a phase discriminator,
a low pass filter, and
a voltage controlled oscillator; and wherein
the phase discriminator is configured to input two channels of clock signals, one channel of clock signals is clock signals from input data of the demapping unit, and the other channel is feedback clock signals output by the voltage controlled oscillator;
the phase discriminator is configured to output error signals to the low pass filter; and
the low pass filter is configured to filter the error signals and output the filtered error signals to control the voltage controlled oscillator to output the clock to be recovered.

10. The receiving apparatus of claim 7, wherein the phase-locked loop comprises:
a phase discriminator,
a low pass filter, and
a voltage controlled oscillator; and wherein
the phase discriminator is configured to input two channels of clock signals, one channel of clock signals is clock signals which come from the data input clock of the demapping unit and pass through a first frequency divider, and the other channel is feedback clock signals which are output by the voltage controlled oscillator and pass through a second frequency divider;
the phase discriminator is configured to output error signals to the low pass filter; and
the low pass filter is configured to filter the error signals and output the filtered error signals to control the voltage controlled oscillator to output the clock to be recovered.

11. A communication system, comprising:
a first clock correlating unit configured to correlate a clock to be transmitted with a clock of a data frame at a transmitter of a clock transparent-transmission network;
a second clock correlating unit configured to correlate a clock of the data frame at a receiver of the clock transparent-transmission network with a clock to be recovered;
a mapping unit configured to map data to be transmitted to the data frame at the transmitter of the clock transparent-transmission network, wherein the clock of the data frame output after mapping is a transmitter data frame clock to be correlated by the first clock correlating unit; and
a demapping unit configured to demap the data frame at the receiver of the clock transparent-transmission network, wherein the clock of the data frame input by the demapping unit is a receiver data frame clock correlated by the second clock correlating unit in the clock transparent-transmission network.

12. The communication system of claim 11, wherein the clock to be transmitted is the clock corresponding to the data to be transmitted, and further comprises:
an encapsulating unit configured to encapsulate the data to be transmitted which corresponds to the clock to be transmitted, and transmit the data to the mapping unit;
a decapsulating unit configured to decapsulate the data demapped by the demapping unit; and
a sending unit configured to send out the decapsulated data according to the clock to be recovered; wherein
the first clock correlating unit is configured to correlate a data input clock of the encapsulating unit with a data output clock of the mapping unit; and
the second clock correlating unit is configured to correlate a data input clock of the demapping unit with a data output clock of the sending unit.

13. The communication system of claim 11, wherein
the first clock correlating unit comprises a first phase-locked loop, wherein the first phase-locked loop is configured to track the clock to be transmitted, and the clock output by the first phase-locked loop serves as the data output clock of the mapping unit; and
the second clock correlating unit comprises a second phase-locked loop, wherein the second phase-locked loop is configured to track the data input clock of the demapping unit, and output the clock to be recovered.

14. A communication method, comprising:
correlating, at a transmitter of a clock transparent-transmission network, a clock to be transmitted with a clock of a data frame at the transmitter of the clock transparent-transmission network;
correlating, at a receiver of the clock transparent-transmission network, the clock of the data frame at the receiver of the clock transparent-transmission network with a clock to be recovered;
mapping data to be transmitted to the data frame transmitted through the clock transparent-transmission network, and setting up a correlation between the clock to be transmitted and a post-mapping data frame clock; and
demapping the data frame at the receiver of the clock transparent-transmission network, and setting up the correlation between an ante-demapping input data clock and the clock to be recovered.

15. The communication method of claim 14, wherein:
setting up the correlation between the clock to be transmitted and the post-mapping data frame clock further comprises:
using a phase-locked loop to correlate the clock to be transmitted with the post-mapping data frame clock; and
setting up the correlation between the ante-demapping input data clock and the clock to be recovered further comprises:
using the phase-locked loop to correlate an ante-demapping data frame clock and the clock to be recovered.

* * * * *